US00RE47545E

(19) United States
(12) Reissued Patent
Grenier et al.

(10) Patent Number: US RE47,545 E
(45) Date of Reissued Patent: Jul. 30, 2019

(54) END-TO-END DELAY MANAGEMENT FOR DISTRIBUTED COMMUNICATIONS NETWORKS

(71) Applicant: CommScope Technologies LLC, Hickory, NC (US)

(72) Inventors: James Robert Grenier, Bloomington, MN (US); John M. Hedin, Coon Rapids, MN (US)

(73) Assignee: CommScope Technologies LLC, Hickory, NC (US)

(21) Appl. No.: 15/173,203

(22) Filed: Jun. 3, 2016

Related U.S. Patent Documents

Reissue of:
(64) Patent No.: 8,743,718
Issued: Jun. 3, 2014
Appl. No.: 13/165,294
Filed: Jun. 21, 2011

(51) Int. Cl.
*H04L 12/26* (2006.01)

(52) U.S. Cl.
CPC ..... *H04L 43/10* (2013.01)

(58) Field of Classification Search
CPC ..... H04L 43/10; H04L 12/26
USPC ..... 370/236, 250–256, 389; 455/404.2, 423, 455/433, 445
See application file for complete search history.

(56) References Cited

U.S. PATENT DOCUMENTS 4,183,054 A 1/1980 Patisaul et al.
4,611,323 A 9/1986 Hessenmuller
4,628,501 A 12/1986 Loscoe
4,654,843 A 3/1987 Roza et al.
4,691,292 A 9/1987 Rothweiler
(Continued)

FOREIGN PATENT DOCUMENTS

CN 1738298 2/2006
CN 101803301 8/2010
(Continued)

OTHER PUBLICATIONS

Canadian Intellectual Property Office, "Office Action for CA Application No. 2,838,729", "Foreign Counterpart for U.S. Appl. No. 13/165,294", Dec. 28, 2016, pp. 1-4, Published in: CA.
(Continued)

*Primary Examiner* — My Trang Ton
(74) *Attorney, Agent, or Firm* — Fogg & Powers LLC

(57) ABSTRACT

A method for calculating delay in a distributed antenna system includes sending a ping initiation message from a remote node to a host node in a distributed antenna system. The ping initiation message uniquely identifies a first communication port of the remote node to the host node with a unique identification. The method also includes receiving a ping reply message at the remote node. The ping reply message corresponds to the ping initiation message and also uniquely identifies the first communication port of the remote node with the unique identification. The method also includes determining, at the remote node, whether the ping reply message corresponds to the first communication port of the remote node based on the unique identification. The method also includes, when the ping reply message corresponds to the first communication port of the remote node, calculating the round-trip time delay between sending the ping initiation message and receiving the ping reply message at the remote node.

44 Claims, 9 Drawing Sheets

(56) References Cited

U.S. PATENT DOCUMENTS

| | | | | |
|---|---|---|---|---|
| 4,999,831 | A | 3/1991 | Grace | |
| 5,193,109 | A | 3/1993 | Chien-Yeh Lee | |
| 5,243,598 | A | 9/1993 | Lee | |
| 5,321,849 | A | 6/1994 | Lemson | |
| 5,339,184 | A | 8/1994 | Tang | |
| 5,506,847 | A | 4/1996 | Shobatake | |
| 5,805,983 | A | 9/1998 | Naidu et al. | |
| 6,205,120 | B1 | 3/2001 | Packer | |
| 6,236,365 | B1 | 5/2001 | LeBlanc et al. | |
| 6,430,160 | B1 | 8/2002 | Smith | |
| 6,539,026 | B1 | 3/2003 | Waclawsky | |
| 6,597,678 | B1 * | 7/2003 | Kuwahara et al. | 370/342 |
| 6,647,210 | B1 | 11/2003 | Toyoda | |
| 6,690,892 | B1 | 2/2004 | Effenberger | |
| 6,700,893 | B1 | 3/2004 | Radha | |
| 6,791,949 | B1 | 9/2004 | Ryu et al. | |
| 6,952,181 | B2 * | 10/2005 | Karr et al. | 342/457 |
| 6,977,942 | B2 | 12/2005 | Raisanen | |
| 7,035,210 | B2 | 4/2006 | Walles | |
| 7,058,050 | B2 | 6/2006 | Johansson et al. | |
| 7,113,536 | B2 | 9/2006 | Alriksson et al. | |
| 7,161,926 | B2 | 1/2007 | Elson et al. | |
| 7,184,920 | B2 | 2/2007 | Sunden et al. | |
| 7,546,138 | B2 * | 6/2009 | Bauman | 455/524 |
| 7,940,685 | B1 * | 5/2011 | Breslau | H04L 43/0835 370/251 |
| 8,050,246 | B2 * | 11/2011 | Wala et al. | 370/347 |
| 8,224,233 | B2 * | 7/2012 | Brisebois et al. | 455/1 |
| 8,428,550 | B2 * | 4/2013 | Larsen | 455/404.2 |
| 8,743,718 | B2 | 6/2014 | Grenier et al. | |
| 2003/0185571 | A1 * | 10/2003 | Lee et al. | 398/102 |
| 2004/0063454 | A1 | 4/2004 | Sasaki | |
| 2004/0165532 | A1 | 8/2004 | Poor et al. | |
| 2005/0021737 | A1 | 1/2005 | Ellison et al. | |
| 2006/0037069 | A1 * | 2/2006 | Fisher et al. | 726/11 |
| 2007/0064618 | A1 * | 3/2007 | Garcia et al. | 370/252 |
| 2008/0194226 | A1 * | 8/2008 | Rivas et al. | 455/404.2 |
| 2009/0046586 | A1 * | 2/2009 | Stuart et al. | 370/236 |
| 2010/0008250 | A1 * | 1/2010 | Nomura et al. | 370/252 |
| 2010/0202356 | A1 | 8/2010 | Fischer et al. | |
| 2010/0226296 | A1 * | 9/2010 | Wala et al. | 370/294 |
| 2011/0039497 | A1 | 2/2011 | Hammarwall et al. | |
| 2011/0122772 | A1 * | 5/2011 | Stuart | 370/236 |
| 2012/0218911 | A1 * | 8/2012 | Zhu et al. | 370/252 |
| 2012/0257516 | A1 * | 10/2012 | Pazhyannur et al. | 370/252 |
| 2012/0327800 | A1 * | 12/2012 | Kim et al. | 370/252 |

FOREIGN PATENT DOCUMENTS

| | | |
|---|---|---|
| EP | 0391597 | 10/1990 |
| KR | 1019950704866 | 10/2002 |
| KR | 1020030001491 | 1/2003 |
| KR | 1020030059259 | 7/2003 |
| KR | 20100060032 | 6/2010 |
| WO | 9115927 | 10/1991 |
| WO | 2009023689 | 2/2009 |
| WO | 2009023689 A3 | 5/2009 |

OTHER PUBLICATIONS

European Patent Office, "Decision to refuse a European Patent Application—Application No. 12802489.0", "from Foreign Counterpart of U.S. Appl. No. 15/173,203", Dec. 13, 2016, pp. 1-38, Published in: EP.

European Patent Office, "EPO Minutes of Oral Proceedings Application No. 12802489.0", "from Foreign Counterpart of U.S. Appl. No. 15/173,203", Dec. 13, 2016, pp. 1-4, Published in: EP.

Canadian Intellectual Property Office, "Office Action for CA Application No. 2,838,729", "Foreign Counterpart to U.S. Appl. No. 13/165,294", Jul. 13, 2017, pp. 1-4, Published in: CA.

Canada Patent Office, "Office Action for CA Application No. 2,838,729", "from Foregin Counterpart of U.S. Appl. No. 13/165,294", Nov. 24, 2015, pp. 1-6, Published in: CA.

Canada Patent Office, "Office Action for CA Application No. 2,838,729", "from Foregin Counterpart of U.S. Appl. No. 13/165,294", Jun. 13, 2016, pp. 1-3, Published in: CA.

China Patent Office, "Notification to Grant for CN Application No. 201280040774.6", "from Foreign Counterpart to U.S. Appl. No. 13/165,294", Mar. 7, 2016, pp. 1-5, Published in: CN.

China Patent Office, "First Office Action from CN Application No. 201280040774.6", "from Foreign Counterpart to U.S. Appl. No. 13/165,294", Jan. 7, 2015, pp. 1-13, Published in: CN.

China Patent Office, "Second Office Action for CN Application No. 201280040774.6", "from Foreign Counterpart to U.S. Appl. No. 13/165,294", Jul. 28, 2015, pp. 1-8, Published in: CN.

China Patent Office, "Third Office Action for CN Application No. 201280040774.6", "from Foreign Counterpart to U.S. Appl. No. 13/165,294", Nov. 17, 2015, pp. 1-7, Published in: CN.

European Patent Office, "Extended European Search Report for EP Application No. 12802489.0", "from Foregin Counterpart of U.S. Appl. No. 13/165,294", Nov. 3, 2014, pp. 1-9, Published in: EP.

European Patent Office, "Office Action for EP Application No. 12802489.0", "from Foregin Counterpart of U.S. Appl. No. 13/165,294", Sep. 25, 2015, pp. 1-4, Published in: EP.

European Patent Office, "Office Action for EP Application No. 12802489.0", "from Foregin Counterpart of U.S. Appl. No. 13/165,294", Feb. 23, 2016, pp. 1-6, Published in: EP.

Korean Patent Office, "Decision to Grant Korean Patent Application No. 2014-7000956", "from Foreign Counterpart to U.S. Appl. No. 13/165,294", May 27, 2015, pp. 1-3, Published in: KR.

Korean Patent Office, "Office Action from KR Application No. 2014-7000956", "from Foregin Counterpart of U.S. Appl. No. 13/165,294", Feb. 6, 2015, pp. 1-4, Published in: KR.

The International Bureau of WIPO, "International Preliminary Report on Patentability from PCT Application No. PCT/US2012/042237 mailed Jan. 9, 2014", "from PCT Counterpart of U.S. Appl. No. 13/165,294", Jan. 9, 2014, pp. 1-6, Published in: WO.

International Searching Authority, "International Search Report from PCT Application No. PCT/US2012/042237 mailed Jan. 23, 2013", "from PCT Counterpart of U.S. Appl. No. 13/165,294", Jan. 23, 2013, pp. 1-9, Published in: WO.

"Ping (Networking Utility)", Jun. 19, 2011, pp. 1-5, Publisher: Wikipedia.

U.S. Patent and Trademark Office, File History from U.S. Appl. No. 13/165,294, 411 Pages, Published: US.

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

* cited by examiner

END-TO-END DELAY MANAGEMENT FOR DISTRIBUTED COMMUNICATIONS NETWORKS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*This Reissue Application is a reissue of application Ser. No. 13/165,294, filed Jun. 21, 2011, which issued as U.S. Pat. No. 8,743,718.* The present application is related to commonly assigned and co-pending U.S. patent application Ser. No. 11/839,086 (hereafter "the '086 Application") entitled "DELAY MANAGEMENT FOR DISTRIBUTED COMMUNICATIONS NETWORKS", filed on Aug. 15, 2007 (currently pending). The present application is also related to commonly assigned and co-pending U.S. patent application Ser. No. 13/019,571 (hereafter "the '571 Application") entitled "DELAY MANAGEMENT FOR DISTRIBUTED COMMUNICATIONS NETWORKS", filed on Feb. 2, 2011. The '086 Application and the '571 Application are incorporated herein by reference in their entirety.

BACKGROUND

Distributed antenna systems are widely used to seamlessly extend coverage for wireless communication signals to locations that are not adequately served by conventional base stations or to distribute capacity from centralized radio suites. These systems typically include a host unit and a plurality of remote units. The host unit is typically coupled between a base station or radio suite and the plurality of remote units in one of many possible network configurations, such as hub and spoke, daisy-chain, or branch-and-tree. Each of a plurality of remote units includes one or more antennas that send and receive wireless signals on behalf of the base station or radio suites.

One common issue in distributed antenna systems is adjusting for the different delay associated with each of the remote units. Each remote unit is typically located at a different distance from the host unit. To allow the various antennas to be synchronized, a delay value is typically set at each remote unit. Unfortunately, conventional techniques used to establish the delay for the various remote units have added significant complexity and/or cost to the distributed antenna system. For example, some common network synchronization techniques involve the use of various locating technologies, such as global positioning systems (GPS), that add further complexities and cost to operating these distributed antenna systems reliably and efficiently.

For the reasons stated above and for other reasons stated below which will become apparent to those skilled in the art upon reading and understanding the present specification, there is a need in the art for improvements in delay management for distributed communications networks.

SUMMARY

A method for calculating delay in a distributed antenna system includes sending a ping initiation message from a remote node to a host node in a distributed antenna system. The ping initiation message uniquely identifies a first communication port of the remote node to the host node with a unique identification. The method also includes receiving a ping reply message at the remote node. The ping reply message corresponds to the ping initiation message and also uniquely identifies the first communication port of the remote node with the unique identification. The method also includes determining, at the remote node, whether the ping reply message corresponds to the first communication port of the remote node based on the unique identification. The method also includes, when the ping reply message corresponds to the first communication port of the remote node, calculating the round-trip time delay between sending the ping initiation message and receiving the ping reply message at the remote node.

DRAWINGS

These and other features, aspects, and advantages are better understood with regard to the following description, appended claims, and accompanying drawings where:

DETAILED DESCRIPTION

The following detailed description relates to delay management for distributed communications networks, such as a distributed antenna system. The delay management discussed here enables a network manager to establish a desired delay at a plurality of remote nodes in a point-to-multipoint or multipoint-to-multipoint communications network with a suitable high degree of repeatability and control. The desired delay can be for each of the remote nodes collectively or for each individual remote node. Advantageously, the communications network discussed here uses an end-to-end approach to determine a signal path delay from a host node to each remote node in the system. This is accomplished at each remote node by discovering a signal path delay (such as the travel time) over the link between the remote node and a host node. The signal path delay between each remote node and a host node accounts for individual processing delays of the remote nodes.

Once the signal path delays for each of the remote nodes are determined, the desired delay at each remote node can be definitively established by accounting for the signal path delay back to the host node and any known internal processing delays. In this manner, every remote node in the system is constantly aware of its distance (in signal time) from the host node. This allows each remote node to independently adjust the delay of its transmissions to maintain a selected delay in the system at each of the nodes. While much of this description describes an embodiment having a single host node, other embodiments include multiple host nodes connected to various remote nodes. In addition, signal path delays may be calculated from the remote node to a plurality of different host nodes.

Furthermore, the delay management discussed here does not require the use of additional node positioning and timing techniques (such as using GPS) to synchronize message delivery between the nodes. Rather than rely on a separate system (such as GPS timing references) to determine the timing delay between each of the nodes, the system and methods described herein provide a substantially simplified means of determining signal path delays between each of the remote nodes and a host node.

The delay management technique described herein is topology independent. The delay management technique is applicable to a wide range of network topologies, such as star, tree, and daisy-chained network configurations, and combinations thereof Moreover, this delay management is medium-independent, and functions on a plurality of network infrastructures, such as wireless, free space optics, millimeter wave, twisted pair, coaxial, optical fiber, hybrid fiber, and suitable combinations thereof.

Figure 1A:
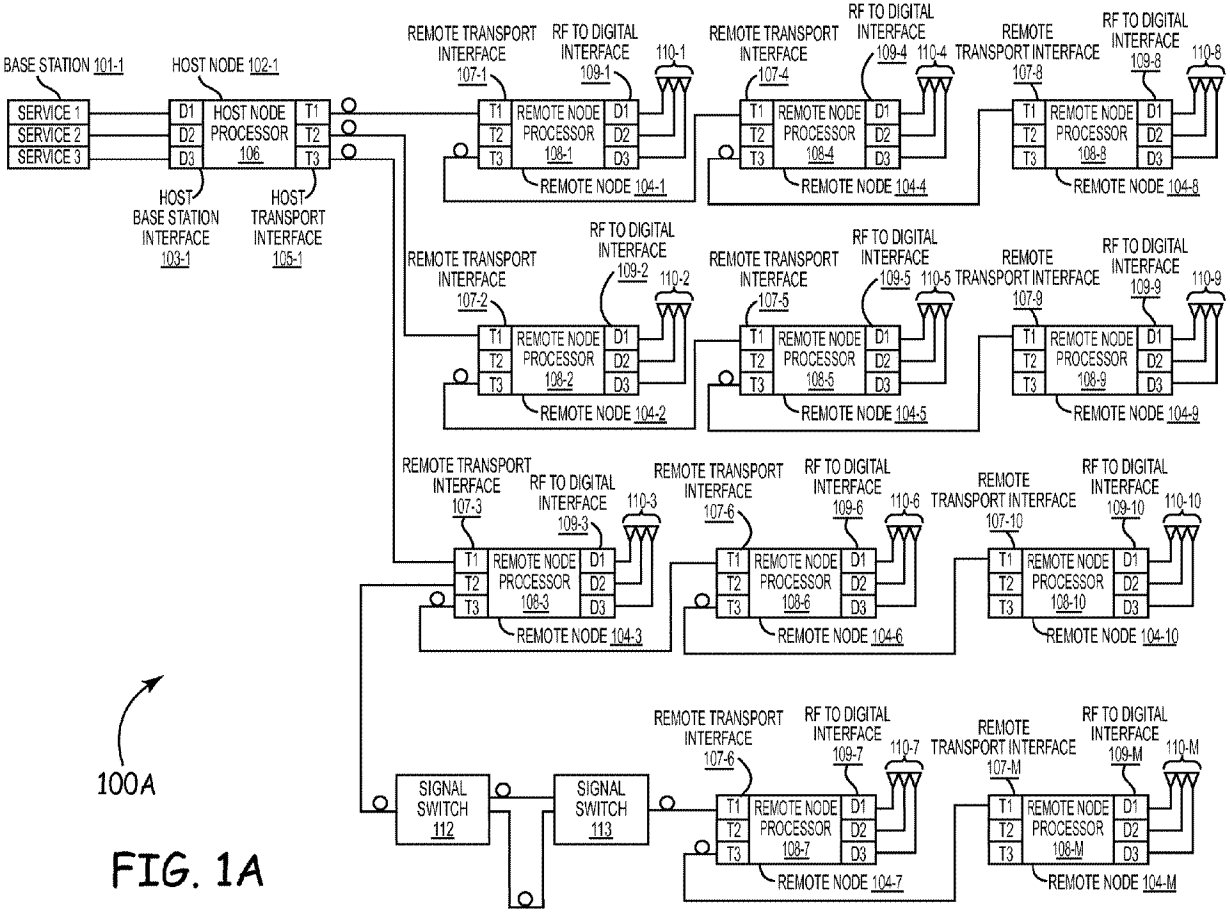
FIG. 1A is a block diagram of one embodiment of a distributed communications network.
Figure 1B:
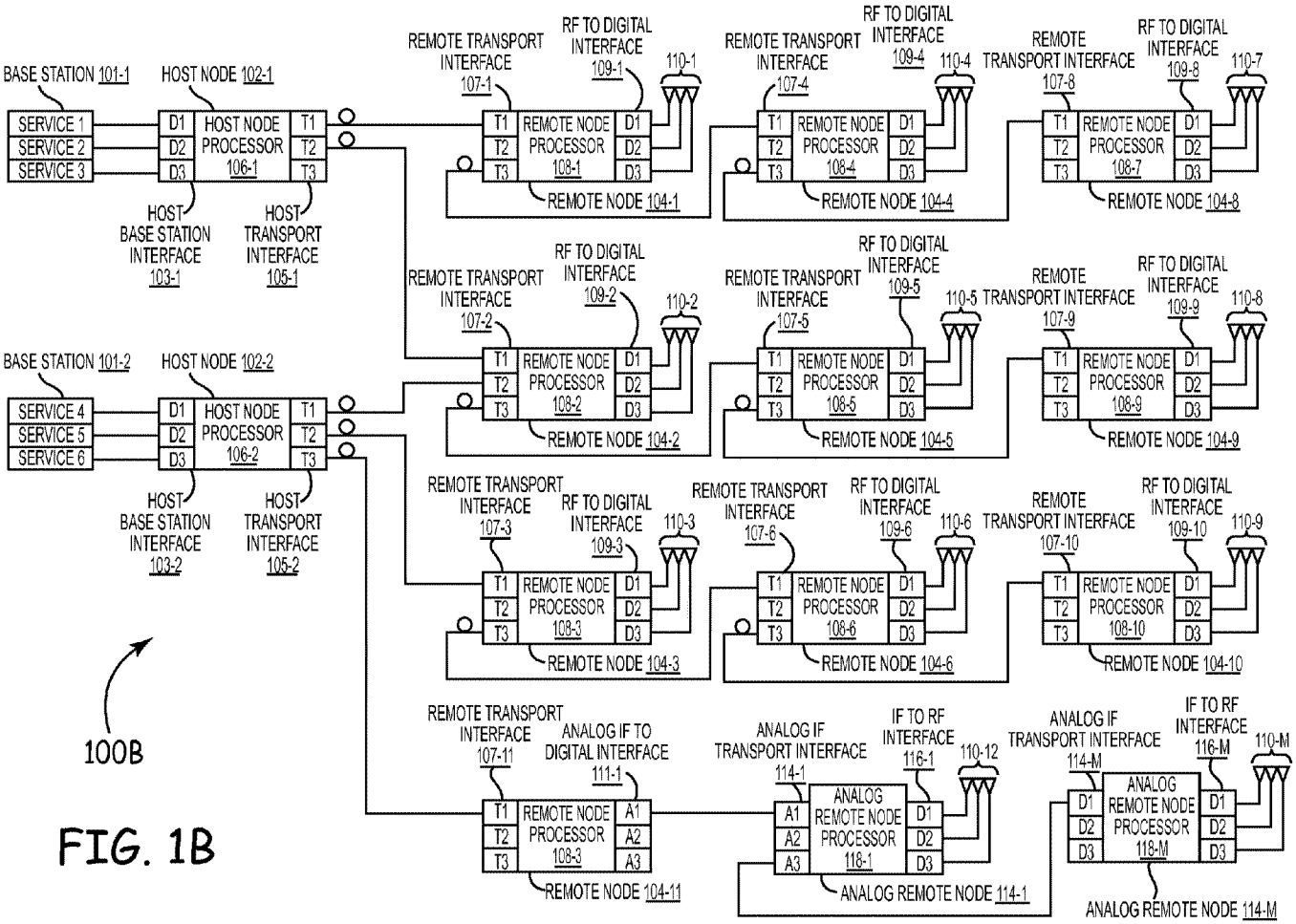
FIG. 1B is a block diagram of another embodiment of a distributed communications network.

FIGS. 1A-1B are block diagrams of embodiments of a communication network 100. Each of FIGS. 1A-1B shows a different embodiment of a communication network 100. The various embodiments are labeled communications network 100A through communications network 100B. It is understood that aspects of these embodiments can be combined together to create additional embodiments sharing features from any combination of the embodiments.

FIG. 1A is block diagram of one exemplary embodiment of a communications network 100, labeled communications network 100A. The communications network 100A represents a point-to-multipoint communications network that comprises a base station 101, a host node 102 responsive to the base station 101, and remote nodes 104-1 to 104-M in communication with the host node 102. The host node 102 comprises a host base station interface 103 and a host transport interface 105 responsive to a host node processor 106. Each of the remote nodes 104 (such as remote nodes 104-1 to 104-M) comprises a remote transport interface 107 (such as remote transport interface 107-1 to 107-M) and an RF to digital interface 109 (such as RF to digital interface 109-1 to 109-M), both responsive to a remote node processor 108 (such as remote node processor 108-1 to 108-M). Each of the RF to digital interfaces 109 (such as RF to digital interface 109-1 to 109-M) is further responsive to an antenna port 110 (such as antenna port 110-1 to 110-M).

In some embodiments, each host node processor 106 and remote node processor 108 is configured to execute software or firmware (not shown) that causes the host node processor 106 and/or the remote node processor 108 to carry out various functions described herein. The software comprises program instructions that are stored (or otherwise embodied) on an appropriate non-transitory storage medium or media (not show) such as flash or other non-volatile memory, magnetic disc drives, and/or optical dist drives. At least a portion of the program instructions are read from the storage medium by host node processor 106 and/or remote node processor 108 for execution thereby. The storage medium on or in which the program instructions are embodied is also referred to here as a "program product". In some embodiments, the storage medium is local to each host node processor 106 and/or remote node processor 108. In other embodiments, the storage medium is a remote storage medium (for example, storage media that is accessible over a network or communication link) and/or a removable media. In some embodiments, each host node processor 106 and/or remote node processor 108 also includes suitable memory (not shown) that is coupled to host node processor 106 and/or remote node processor 108 for storing program instructions and data.

In some embodiments, each host base station interface 103 and each RF to digital interface 109 is implemented with a Digital/Analog Radio Transceiver (DART board) commercially available from ADC Telecommunications, Inc. of Eden Prairie, Minn. as part of the FlexWave™ Prism line of products. The DART board is also described in U.S. patent application Ser. No. 11/627,251, assigned to ADC Telecommunications, Inc., published in U.S. Patent Application Publication No. 2008/01101482, and incorporated herein by reference. In other embodiments, each host base station interface 103 and each RF to digital interface 109 is implemented with a plurality of DART boards, where one DART board is used for each port (such as D1, D2, D3) at a host node 102 or a remote node 104. In other embodiments, different ratios of DART boards to ports can be used. In other embodiments, some of the host base station interfaces 103 do not convert between analog and digital and instead receive digital signals directly from the base station 101. In these embodiments, the digital signals may be reframed, converted to a different frequency, or manipulated in other ways at host base station interfaces 103, even though there is no conversion from analog RF spectrum to digitized RF spectrum.

In one embodiment, each host transport interface 105 and each remote transport interface 107 is implemented with a Serialized RF (SeRF board) commercially available from ADC Telecommunications, Inc. of Eden Prairie, MN as part of the FlexWave™ Prism line of products. The SeRF board is also described in U.S. patent application Ser. No. 11/627,251, assigned to ADC Telecommunications, Inc., published in U.S. Patent Application Publication No. 2008/01101482, and incorporated herein by reference. In other embodiments, each host transport interface 105 and each remote transport interface 107 is implemented with a plurality of SeRF boards, where one SeRF board is used for each port (such as T1, T2, T3) at a host node 102 or a remote node 104.

In one embodiment, the host node processor 106 and each remote node processor 108 are programmable processors, such as a microcontroller, an application-specific integrated circuit (ASIC), a field-programmable gate array (FPGA), a field-programmable object array (FPOA), or a programmable logic device (PLD). It is understood that the network 100A is capable of accommodating any appropriate number of remote nodes 104 as described above in communication network 100A. In some embodiments, communication network 100A includes fewer remote nodes 104 than those shown in FIG. 1A. In other embodiments, system 100A includes more remote nodes 104 than those shown in FIG. 1A.

The host node 102 and the remote nodes 104 are communicatively coupled by a plurality of signal paths in a tree-and-branch network configuration representing a plurality of levels. In the example embodiment of communication network 100A shown in FIG. 1A, the tree-and-branch network configuration further includes signal switches 112 and 113. Each of the signal paths illustrated in FIG. 1A are at least one of an electrical link, an optical fiber link, and a wireless transport link (such as millimeter wave, free space optics, or suitable combinations thereof), providing a medium-independent network architecture. It is understood that additional network configurations (such as a hub and spoke, a common bus, and the like) are also contemplated.

The host base station interface 103 and each of the RF to digital interfaces 109 include ports D1, D2, and D3. The ports D1, D2, and D3 are considered representative of a plurality of signal interference connections (such as RF, Ethernet, and the like) for the host base station interface 103 and each of the RF to digital interfaces 109. In some embodiments, the host base station interface 103 converts between analog RF spectrum received from the base station 101 and digitized spectrum that is communicated with the remote nodes 104. In other embodiments, the host base station interface 103 communicated digitized spectrum or signals with the base station 101. In these embodiments, while the digitized spectrum or signals communicated with the base station 101 are not converted between analog and digital, the framing of the digitized spectrum or signals may need to be converted between the digitized spectrum or signals communicated with the base station 101 and the digitized spectrum communicated with the remote nodes 104.

Similarly, the host transport interface 105 and each of the remote transport interfaces 107 include ports T1, T2, and T3. The ports T1, T2, and T3 are considered representative of a plurality of transport interface connections for the host transport interface 105. Each of the remote transport interfaces 107 provide an appropriate signal conversion (such as a digital to serial or serial optical fiber) for each of the remote nodes 104 and the host node 102 of the communication network 100A. It is understood that the ports D1 to D3 and T1 to T3 shown in FIG. 1 are not to be considered limiting the number of signal interface and transport ports contemplated by the system discussed here (e.g., the communication network 100A is capable of accommodating any appropriate number of instances of signal interface and transport ports).

Each remote node 104 (such as remote node 104-1 to 104-M) introduces one or more intrinsic processing delays. For example, the remote transport interfaces 107 includes a first intrinsic processing delay when passing signals between the transport interface connections T1 and T3 (commonly referred to as a "fiber-to-fiber" delay in this example). Similarly, each of the RF to digital interfaces 109 includes a second intrinsic processing delay for converting signals between digital and RF. In some instances, the intrinsic processing delays in RF to digital interface 109 are asymmetrical. This means that the intrinsic processing delay for upstream signals (signals going to the host node 102) and the intrinsic processing delay for downstream signals (signals coming from the host node 102) are different. In one embodiment, the various intrinsic processing delays are embedded in each of the remote node processors 108 (such as remote node processor 108-1 to 108-M) for use in establishing the requested delay for the node.

In operation, communication network 100A implements an end-to-end pinging process to determine the signal path delay between each port (such as D1, D2, and D3) in the RF to digital interface 109 at each remote node 104 and a corresponding host base station interface 103 at the host node 102. In this end-to-end pinging process, each port in the RF to digital interface 109 at each remote node 104 in the communication network 100A discovers its signal path delay back to a corresponding port in the host base station interface 103 of the host node 102 by sending a ping message to the host node 102 through the communication network 100A. The corresponding port in the host base station interface 103 of the host node 102 returns the ping message to the corresponding port of the RF to digital interface 109 of the pinging remote node 104. The ping message is sent along a path between the pinging remote node 104 and the host node 102. A particular pinging remote node 104 may be directly coupled with the host node 102, such as with remote nodes 104-1, 104-2, and 104-3.

A particular pinging remote node 104 may also have other remote nodes 104 intervening between itself and the host node 102, such as with remote node 104-4 that has remote node 104-1 intervening; remote node 104-8 that has both remote node 104-4 and 104-1 intervening; remote node 104-5 that has remote node 104-2 intervening; remote node 104-9 that has both remote nodes 104-5 and 104-2 intervening; remote node 104-6 that has remote node 104-3 intervening; and remote node 104-10 that has both remote node 104-6 and 104-3 intervening. In addition, a particular pinging remote node 104 may also have other components, or a combination of other components and other remote nodes, intervening between itself and the host node 102, such as remote node 104-7 that has signal switches 112 and 113 and remote node 104-3 intervening; and remote node 104-M that has remote node 104-7, signal switches 112 and 113, and remote node 104-3 intervening. In other embodiments, any number of intervening remote nodes 104 or other components (such as signal switches, etc.) may be intervening between a particular remote node 104 and the host node 102.

The signal path delay between a pinging port of the RF to digital interface 109 of a particular remote node 104 is calculated based on the elapsed round-trip ping time between sending a ping message from the pinging port of the RF to digital interface 109 of the remote node 104 and receiving back a corresponding reply ping message from the corresponding port of the host base station interface 103 of the host node 102. In some example embodiments, the signal path delay for a particular remote node 104 is calculated to be this round-trip ping time. In other example embodiments, the signal path delay for a particular remote node 104 is calculated to be a fraction of this round-trip ping time, such as one-half of the round-trip ping time. In other example embodiments, the signal path delay for a particular remote node 104 is calculated from the round-trip ping time in other ways. While the precise method of calculation may vary from one embodiment to another, it is desirable that the method of calculation is consistent and defined for all remote nodes 104 in the communication network 100A so that the signal path delay values for each remote node 104 can be properly used to adjust the delay associated with each remote node 104 in the communication network 100A.

Thus, each signal path delay between each pinging port of the RF to digital interface 109 of each remote node 104 and the corresponding port of the host base station interface 103 of the host node 102 is calculated to represent the entire delay between the pinging port of the RF to digital interface 109 of the particular remote node 104 and the corresponding port of the host base station interface 103 of the host node 102, including any transport delay, internal processing delay, and other intrinsic processing delay present between the pinging port of the RF to digital interface 109 of the pinging remote node 104 and the corresponding port of the host base station interface 103 of the host node 102. By calculating the end-to-end ping between each port of each RF to digital interface 109 of each remote node 104 and its corresponding port of the host base station interface 103 of the host node 102, it is not necessary to factor in the internal processing delay (or other intrinsic delay) at each intervening remote node between a particular pinging remote node 104 and the host node 102. The end-to-end ping is computationally less intensive than other methods requiring computation and aggregation of the delays associated with each hop between nodes in the network. The current system and method allow a reduction of resource usage and lower overhead at each node in the communication network 100A.

Some embodiments of the communication network 100A implement simulcast, where at least one of the ports of the host base station interface 103 of the host node 102 corresponds to a plurality of ports of at least one RF to digital interface 109. For example, in some embodiments, at least one of the ports of the host base station interface 103 of the host node 102 corresponds to both a first port in a first RF to digital interface 109 in a first remote node 104 (such as RF to digital interface 109-1 of remote node 104-1) and a second port in a second RF to digital interface 109 in a second remote node 104 (such as RF to digital interface 109-2 of remote node 104-2 or any of the other RF to digital interfaces 109 of any of the other remote nodes 104). In these type of simulcast configurations, one port of the host base station interface 103 of the host node 102 communicates identical digitized spectrum in the forward link with a plurality of ports at a plurality of RF to digital interfaces 109 at a plurality of remote nodes 104. In these type of simulcast configurations, the plurality of ports at the plurality of RF to digital interfaces 109 at a plurality of remote nodes 104 communicate digitized spectrum in the reverse path that is aggregated and received at the single port of the host base station interface 103 of the host node 102. In some embodiments, the reverse path signal is aggregated through a series of summations. The actual method of aggregation of the simulcast may be done in various ways while still utilizing the methods and systems of end-to-end determination of delay described herein.

In some embodiments, it is necessary to add an internal processing delay and/or some other type of intrinsic delay associated with the particular pinging remote node 104 and the host node 102. Specifically, the host node may have some internal processing delay associated with its host base station interface 103 (or any other internal processing delay not accounted for by the round-trip ping time) that can be used with the round-trip ping time and any other intrinsic delays that are not accounted for by the round-trip ping time to determine the signal path delay. In addition, the particular pinging remote node may have some internal processing delay associated with its RF to digital interface 109 or the respective antenna port 110 (or any other internal processing delay not accounted for by the round-trip ping time) that can be used with the round-trip ping time and any other intrinsic delays that are not accounted for by the round-trip ping time to determine the signal path delay.

The remote nodes 104 (such as 104-1 to 104-M) use the signal path delay calculated through this process to control the overall delay selected for each RF to digital interface 109 of each remote node 104. For example, a total delay for each RF to digital interface 109 of each remote node may be established during network installation. Each RF to digital interface 109 of each remote node sets the amount of delay that it introduces into signals based on the signal path delay learned using the above-described process. Thus, a common time base is established for RF to digital interfaces 109 in the remote nodes 104 in communication network 100A.

In addition to calculating signal path delay, the ping messages may be used to verify integrity of the round-trip path. Both ping messages sent from RF to digital interfaces 109 of remote nodes 104 and reply ping messages sent from host base station interfaces 103 of host nodes 102 may be protected and validated by a cyclic redundancy check (CRC). In some embodiments, messages received at either host base station interfaces 103 of the host node 102 or RF to digital interfaces 109 of remote nodes 104 with invalid CRCs are ignored. Specifically, when a ping message received at a host digital interface 109 of a host node 102 is identified as having an invalid CRC, the host base station interface 103 of the host node 102 will not send a reply ping message in response. Similarly, when a ping message received at a RF to digital interface 109 of a remote node 104 is identified as having an invalid CRC, the RF to digital interface 109 of the remote node 104 ignores the invalid message. In some embodiments, there may be other types of validity checks used to validate the integrity of the messages transmitted through the communication network 100A.

In addition, due to the simulcast nature of the communication network 1 OOA, a first reverse path ping message initiated by a RF to digital interface 109 of one of the remote nodes 104 (such as RF to digital interface 109-1 of remote node 104-1) might collide with a second reverse path ping message initiated by another RF to digital interface 109 of another one of the remote nodes 104 (such as RF to digital interface 109-2 of remote node 104-2). A collision between two ping messages may cause both messages to be corrupted so that neither ping message is received intact at a host base station interface 103 of a host node 102 (such as host base station interface 103-1 of host node 102-1). The corrupted message received at the host base station interface 103 of the host node 102 may include bits from both the first and second reverse path ping messages. Such a corrupted message will be identified as invalid by the CRC performed by the host base station interface 103 of host node 102 and will not be replied to by the host base station interface 103 of host node 102.

To detect and recover from a collision, an embodiment of communication network 100A may include configuration of each RF to digital interface 109 at each remote node 104 to detect whether or not it has received a valid ping reply message from the replying host digital interface 103 of the replying host node 104 in response to its initial ping message within a predefined amount of time. If a ping reply message is received at the pinging RF to digital interface 109 of the pinging remote node 104 before expiration of a predefined response and the ping message both: (1) has a valid CRC; and (2) corresponds to the pinging RF to digital interface 109 of the pinging remote node 104, then the round-trip delay and signal path delay are calculated. Alternatively, if no ping reply message that both (1) has a valid CRC and (2) corresponds to the pinging RF to digital interface 109 of the pinging remote node 104 is received at the pinging RF to digital interface 109 of the particular remote node 104, then the ping message is resent when the next ping trigger occurs. Ping triggers occur at pseudo-random time intervals. The ping trigger interval may be determined at each pinging remote node based on a pseudo-random back-off algorithm to minimize the chance of a collision between other upstream messages.

While the detection, timeout, retry cycle above could repeat indefinitely, some embodiments of communication network 100A may further calculate how many times a particular ping message has been sent from a pinging RF to digital interface of a pinging remote node 104 without a valid corresponding reply ping message having been received. If the particular ping message has been resent by the pinging RF to digital interface 103 of the pinging remote node 104 over a predetermined number of times without having received a valid corresponding reply ping message, then a path integrity alarm may be reported at the particular pinging remote node 104 in the communication network 100A indicating that something is wrong with the data path between the pinging RF to digital interface 109 of the pinging remote node 104 and the corresponding host base station interface 103 of the corresponding host node 102. This path integrity alarm may alert a technician to a potential data path error so that the technician can investigate and correct the issue. The number of messages that must fail before the remote node reports a path integrity alarm may be predetermined when the communication network 100A is deployed, but may also be adjusted later. In other embodiments, a timeout period is used instead of a ping trigger.

In addition to calculating the end-to-end ping and verifying the integrity of the round-trip paths, the ping messages may also be used to mute and un-mute the transmission and reception from an antenna coupled to a port of an RF to digital interface 109 on a remote node 104. In some embodiments, a certain number of valid ping messages need to be received back at a pinging RF to digital interface 109 of a remote node 104 before the pinging RF to digital interface un-mutes a port coupled to the associated antenna port 110, allowing transmission and reception of a particular band through the data path between the port of the RF to digital interface 109 (such as port Dl of RF to digital interface 109-4 of remote node 104-4) and a host base station interface 103 (such as port D1 of host base station interface 103 of host node 104) coupled to a service provider interface of base station 101 (such as service provider interface 1 of base station 101-1). This features ensures the integrity of the path and compatibility between the pinging RF to digital interface 109 and the host base station interface 103 before un-muting the communications.

FIG. 1B is block diagram of another exemplary embodiment of a communications network 100, labeled communications network 100B. The communications network 100B represents a multipoint-to-multipoint communications network that shares many components with communications network 100A shown in FIG. 1A and described above. The primary distinction between communications network 100B and communication network 100A is that communication network 100B includes two or more host nodes 102 (such as host node 102-1 and host node 102-2) coupled with two or more base stations 101 (such as base station 101-1 and base station 101-2). In communications network 100B, a single remote node 104 can be coupled to a plurality of host nodes 102 (such as remote node 104-2 which is connected to both host node 102-1 and host node 102-2).

In embodiments having two host nodes, a single remote unit may have two RF to digital interfaces 109, where one is associated with a host base station interface 103 in one host node 102 (such as host base station interface 103-1 of host node 102-1) and the other is associated with a different host base station interface 103 in another host node 102 (such as host base station interface 103-2 in host node 102-2). In other embodiments having two hosts nodes, one port of a RF to digital interface 109 of a remote node (such as D1 of RF to digital interface 109-2 of remote node 104-2) may be associated with one port of one host base station interface 103 in a host node 102 (such as D1 of host base station interface 103-1 of host node 102-1).

In embodiments where each remote node has multiple RF to digital interfaces 109, ping messages are sent for each of the RF to digital interfaces 109 to a host node 102 having a host digital interface 109 associated with the respective RF to digital interface 109. In some embodiments where a remote unit 104 is communicatively coupled to a plurality of host nodes 102, one port of RF to digital interface 109 of the remote unit 104 (such as D1 of RF to digital interface 109-1 of remote node 104-4) may be associated with a host base station interface 103 of one host node 102 (such as host base station interface 103-1 of host node 102-1) while another port of RF to digital interface 109 of the remote node 104 (such as D2 of RF to digital interface 109-1 of the remote node 104-4) may be associated with a host base station interface 103 of another host node 102 (such as host base station interface 103-2 of host node 102-2).

An additional distinction between communications network 100B and communications network 100A is that communication network 100B includes analog remote nodes 114 (such as analog remote nodes 114-1 and 114-M coupled to remote node 104-11). In embodiments implementing analog remote nodes, intermediate frequencies (IF) may be used to transmit multiple bands across a single analog medium. For example, a remote node 104 (such as remote node 104-11) includes an analog IF to digital interface 111 (such as analog IF to digital interface 111-1) that converts between digitized RF spectrum received from the associated host node 102 and an analog IF frequency sent across the analog medium to an analog remote node 114 (such as analog remote node 114-1). In some embodiments, each analog remote node 114 (such as analog remote node 114-1 through analog remote node 114-M) includes an analog IF transport interface 113 (such as analog IF transport interface 113-1 through analog IF transport interface 113-M) and an IF to RF interface 116 (such as IF to RF interface 116-1 through IF to RF interface 116-M) responsive to an analog remote node processor 118 (such as analog remote node processor 118-1 through analog remote node processor 118-M). Each of the IF to RF interfaces 116 (such as IF to RF interface 116-1 to 116-M) is further responsive to an antenna port 110 (such as antenna port 110-12 to 110-M).

As is shown in the example embodiment shown in FIG. 1B, a plurality of analog remote nodes can be daisy chained off from a remote node in the communications network 100B. In other embodiments, other network topologies can be used in both the digital and analog portions of the communications network 100B. In the example embodiment shown in FIG. 1B, the end-to-end ping is only calculated in the digital portions of the network 100B. In some embodiments, an analog IF to digital interface 111 of a remote node 104 (such as analog IF to digital interface 111-1 of remote node 104-11) calculates an end-to-end ping to a host base station interface 103 of a host node 102 (such as host base station interface 103-1 of a host node 102-1) using the methods described herein. The remote node 104-11 can then add in some intrinsic delay to account for the delay through the various portions of the analog system (such as to IF to RF interface 116-1 of analog remote node 114-1 and IF to RF interface 116-M of analog remote node 114-M). In this way, the end-to-end delay between the analog nodes can also be estimated.

In other embodiments, the additional delay in the analog portion of the communications network 100B is disregarded because it is insubstantial compared to the delay introduced by the digital portion of the communication network 100B. This may be the case because the distances between the remote nodes 104 and the host nodes 102 in the digital domain is much greater than the distances between the analog remote nodes 114 and the remote nodes 104 they are connected to (such as remote node 104-11).

Figure 1C:
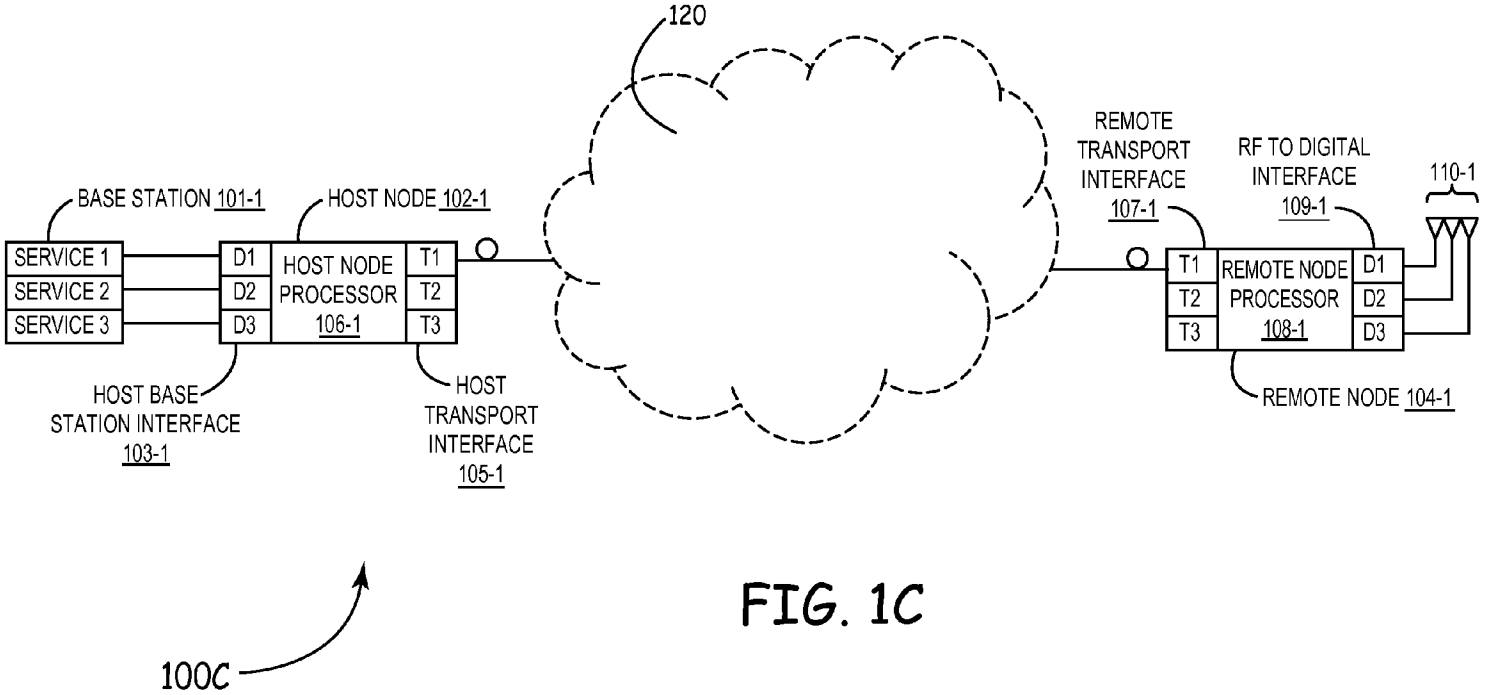
FIG. 1C is a block diagram of another embodiment of a distributed communications network.

FIG. 1C is a block diagram of another exemplary embodiment of a communications network 100, labeled communications network 100C. The communications network 100C represents a communications network that includes the host node 102-1 and the remote node 104-1. Each of host node 102-1 and remote node 104-1 include the components describe above. In some embodiments, additional remote nodes 104 or other components lie between host node 102-1 and remote node 104-1 in optional intervening component section 120. In some embodiments, optional intervening component section 120 includes intervening remote nodes 104, signal switches, and physical links, such as optical fibers, coaxial cables, and wireless links. The communications network 100C implements an end-to-end ping as described herein. The precise contents of the optional intervening component section 120 is not particularly relevant to the end-to-end ping as long as the components in the optional intervening component section 120 properly forward any ping initiation messages and ping reply messages between the host node 102-1 and remote node 104-1.

Figure 2:
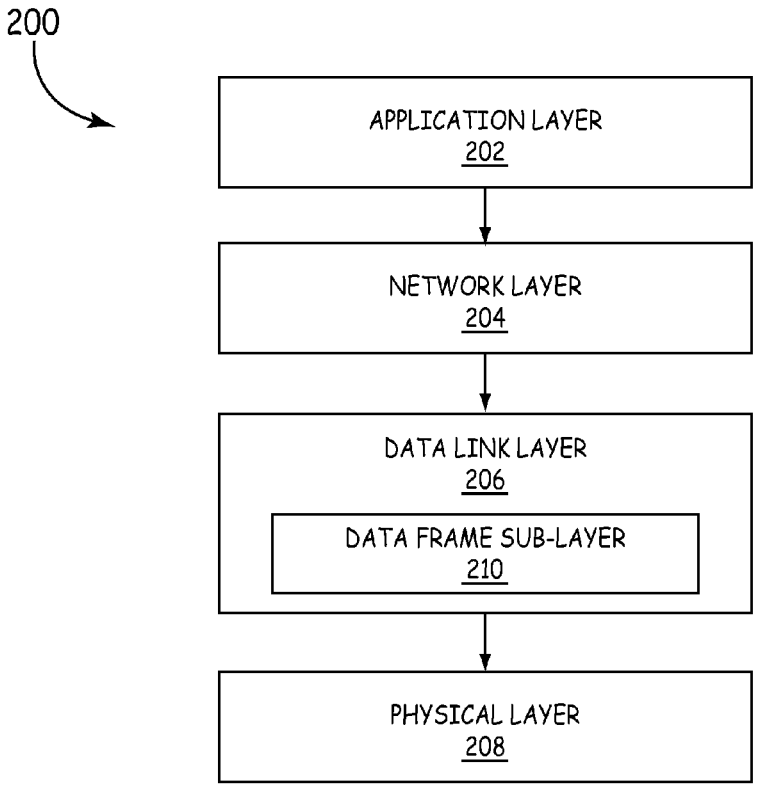
FIG. 2 is a block diagram of an application framework for a distributed communications network.

FIG. 2 is a block diagram of a framework 200 for network applications. The framework 200 comprises multiple layers, discussed below, that provide hardware-related service to enable each node of the communication network 100A to function as shown above with respect to FIG. 1 (e.g., the host node 102 discovers the plurality of remote nodes 104 over the communication network 100A). The framework 200 comprises an application layer 202, a network layer 204, a data link layer 206, and a physical layer 208. Each layer of the framework 200 compartmentalizes key functions required for any node of the communication network 100 to communicate with any other node of the communication network 100.

The physical layer 208 is communicatively coupled to, and provides low level support for the data link layer 206, the network layer 204, and the application layer 202. In some embodiments, the physical layer 208 resides on at least one of an optical fiber network, a coaxial cable network, and a wireless network. The physical layer 208 provides electronic hardware support for sending and receiving data in a plurality of operations from the at least one network application hosted by the host node 102. The data link layer 206 provides error handling for the physical layer 208, along with flow control and frame synchronization. The data link layer 206 further includes a data frame sub-layer 210. The data frame sub-layer 210 comprises a plurality of data frames transferred on the physical layer 208. Additional detail pertaining to the data frame sub-layer 210 is further described below with respect to FIG. 3. The network layer 204 is responsive to at least one programmable processor within the network 100 (for example, the host node processor 106 or at least one of the remote node processors 108). The network layer 204 provides switching and routing capabilities within the network 100 for transmitting data between the nodes within the network 100. The application layer 202 is responsive to at least one of a simple network management protocol (SNMP), a common management information protocol (CMIP), a remote monitoring (RM) protocol, and any network communications protocol standard suitable for remote monitoring and network management.

Figure 3:
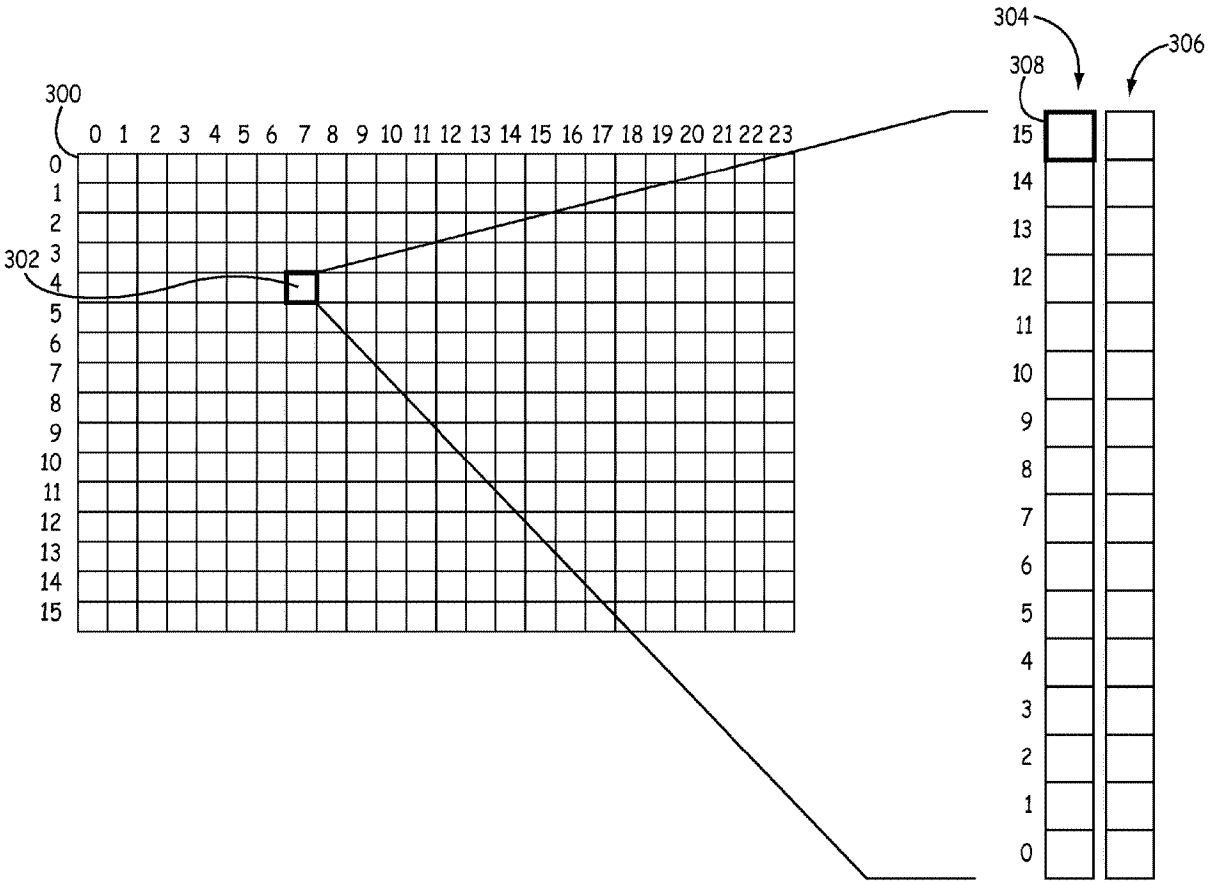
FIG. 3 is a block diagram of a data frame and detailed exemplary I and Q samples within a single timeslot within the data frame.

FIG. 3 is a block diagram of an embodiment of the data frame sub-layer 210 of FIG. 2, represented generally by the sub-layer 300. The sub-layer 300 comprises at least one data frame 302 (or optical fiber frame). Each data frame 302 is composed of a plurality of slots organized into rows and columns as shown in FIG. 3. Each RF to digital interface 109 of each remote node 104 is assigned at least one timeslot in the reverse path to transmit digitized RF spectrum to a host base station interface 103 of a host node 102. In addition, each RF to digital interface 109 of each remote node 104 is assigned at least one timeslot in the forward path to receive digitized RF spectrum from a host base station interface 103 of a host node 102. In some embodiments, a single RF to digital interface 109 is assigned multiple slots in the upstream and/or the downstream. Similarly, in some embodiments, a single host base station interface 103 is assigned multiple slots in the upstream and/or downstream. In some embodiments, implementing simulcast in the forward path, a single host base station interface 103 of a host node 102 may transmit digitized RF spectrum in the downstream on at least one timeslot that is received at a plurality of RF to digital interfaces 109 at a plurality of remote nodes 104. Similarly, in the reverse path, a plurality of RF to digital interfaces 109 at a plurality of remote nodes 104 may transmit digitized RF spectrum in the upstream on the same timeslot, where the digitized RF spectrum is summed together or aggregated in some other way.

Each timeslot, such as example timeslot 304, is composed of an I sample 306 and a Q sample 308. In the example timeslot 304, both the I sample 306 and the Q sample 308 include 16 bits. In the example timeslot 304, the 16th bit of the I sample, bit 310, is used to transmit the ping messages. In some embodiments, a single bit 310 is used in each timeslot of the data frame 302 to transmit the ping messages. Thus, a ping message can span multiple slots in a frame and can also span across frames. In the embodiments shown in FIG. 3, where only one bit per timeslot is used to transmit the ping message, it may take multiple frames to transmit a single ping message.

For example, in some embodiments, the ping message contains approximately 80 bits, requiring 80 slots for transmission. Thus, in an embodiment where an RF to digital interface 109 is assigned one timeslot per row of the data frame 302, it would take five frames to transmit the 80 bits of one ping message. Similarly, in an embodiment where an RF to digital interface 109 is assigned two timeslots per row of the data frame 302, it would take two and a half frames to transmit the 80 bits of one ping message. The combined bits representing the ping message spanning multiple frames are sometimes referred to as a ping message superframe.

An example embodiment of a ping message having 80 bits may include a number of elements. First, a frame header may require 8 bits. The frame header is used to frame the message and identify the message type. Example message types include (1) messages initiated from a remote RF to digital interface 109 and directed toward an analog host base station interface 103, (2) messages initiated from a remote RF to digital interface 109 and directed toward a digital host base station interface 103, (3) messages initiated from an analog host base station interface 103 and directed toward a remote RF to digital interface 109, and (4) messages initiated from a digital host base station interface 103 and directed toward a remote RF to digital interface 109. The digital host base station interface 103 is discussed above as being used when the base station outputs a digital signal to the host node 102 instead of an RF signal.

Second, a time slot count may require 4 bits. The timeslot count is used to identify the number of timeslots the sending DART is programmed to. This timeslot count should agree between the RF to digital interface 109 and the corresponding host base station interface 103 and can be used to verify that the network is correctly configured and/or the integrity of the path the ping message is being sent on.

Third, a host base station interface ID may require 8 bits. The host base station interface ID is a unique identifier code for the host base station interface 103 that may be inserted into the ping reply message by the host base station interface 103. The RF to digital interface 109 at the pinging remote node 104 can then verify that it is compatible with the type of the host base station interface 103 based on the host base station interface ID received back in the ping reply message. If the RF to digital interface 109 at the pinging remote node 104 is not compatible with the type of host base station interface 103 identified in the host base station interface ID, the RF to digital interface 109 can be muted and an alarm can be triggered to indicate a mismatch between the types of the pinging RF to digital interface 109 the host base station interface 103.

Fourth, a unique path code may require 37 bits. The unique path code is a unique value that identifies the path between the RF to digital interface 109 and the host base station interface 103. This unique value serves as a unique identifier for each RF to digital interface 109 in the system 100. In the example embodiment using a 37-bit path code, the system 100 can have up to 8 levels of cascades between the host node and a RF to digital interface 109. In other embodiments, path codes of different lengths can also be used, enabling various sizes of networks and levels of cascades. In some embodiments, this unique path code is supplied to the RF to digital interface 109 by the remote transport interface 107 of the remote node 104.

In some embodiments, the unique path code includes a 4-bit host node ID number that identifies the host node 102 that contains the corresponding host base station interface 103. In embodiments having a 4 bit host node ID number, there are only 16 options for host node ID numbers. If the host base station interface 103 receives a ping message that has a host node ID number that does not match its own, then the message is ignored.

In some embodiments, the unique path code also includes a 3-bit host base station interface ID number that identifies the target host base station interface 103 within the host node 102. In some embodiments, the base station interface ID number also identifies a particular port within the host base station interface 103 of the host node 102. In some embodiments, the base station interface ID number identifies a communication port, such as a low-voltage differential signaling (LVDS) port, of the target host base station interface 103 within the host node 102.

In some embodiments, the unique path code also includes a 27 bit fiber path ID that identifies the path between the host node 102 and the remote node 104. This unique path code may be broken into nine 3-bit values. The first 3-bit value represents the number of levels minus one in the cascaded mesh. For example, a system that only contains a host and a remote would have "000" in this field. The next eight 3-bit values represent the fiber port number of each link in the cascade. In systems with fewer than eight levels, the corresponding 3-bits will be unused and set to "000".

In some embodiments, the unique path code also includes a 3-bit RF to digital interface ID number that identifies the pinging RF to digital interface 109 within the remote node 104. In some embodiments, the base station interface ID number also identifies a particular port within the RF to digital interface 109 of the pinging remote node 104. In some embodiments, the RF to digital interface ID number identifies a low-voltage differential signaling (LVDS) port of the pinging RF to digital interface 109 within the pinging remote node 104.

Fifth, a cyclic redundancy check (CRC) code may require 15-bits. The CRC code may be used to verify the integrity of the ping message. If the CRC fails at the host node 102, no ping reply message will be sent or any returned ping reply message will be incomplete.

Sixth, an additional miscellaneous control status code may require 8-bits. This miscellaneous control status code could be used for other features and functions in the system.

The above description of the components of the ping message describe an exemplary embodiment and it is understood that the amount of bits used by each component and the components included in the ping message may be adjusted as appropriate in specific embodiments.

To determine the end-to-end signal path delay between each RF to digital interface 109 on each remote node 104 and a corresponding host base station interface 103 on the host node 102, a ping message is sent in the reverse path from each RF to digital interface 109 on each remote node 104 to a host base station interface 103 of a host node 104. Upon reception, the host base station interface 103 of the host node 104 validates each ping message received. This validation may include validation of the message type, the host base station interface type, the host node ID number, the host base station ID number, and the CRC code. In some embodiments, a mismatch between any of these validated items and expected values causes the host base station interface 103 to ignore the ping message. In other embodiments, only mismatches of some of the items listed above would cause the host base station interface 103 to ignore the ping message. In other embodiments, the host base station interface 103 or host node processor 106 could trigger an alarm if certain items are not validated.

If a particular ping message is validated at the host node 104, the host node 104 replies to the pinging remote node 104 with a similar reply ping message in the forward direction. Both ping messages sent in the reverse path from the remote nodes 104 to the host node 102 and the reply ping messages sent in the forward path from the host node 102 to the pinging remote nodes 104 include a unique identifier that identifies the particular RF to digital interface 109 uniquely from all the other RF to digital interfaces 109. In some embodiments, the reply ping message is identical to the ping message. In other embodiments, the host base station interface 103 edits or adds to the received ping message in its reply ping message. The replying host base station interface 103 of the host node 102 sends the reply ping message back toward the pinging RF to digital interface 109 of the pinging remote node 104.

The pinging RF to digital interface 109 of the pinging remote node 104 identifies that a reply ping message corresponding to its ping message has been received back by comparing the returned unique identifier with its unique identifiers. If the returned unique identifier matches a particular RF to digital interface 109 at one of the remote nodes 104, the pinging RF to digital interface 109 of the pinging remote node 104 calculates total round-trip delay time between the initial transmission of the ping message and the receipt of the corresponding return ping message.

While the RF to digital interfaces 109 of the remote nodes 104 are described as performing the ping message transmission, reply ping message receipt, reply ping message validation, and round-trip delay calculation, in other embodiments, some or all of these actions are offloaded to the remote node processors 108 or other components of the remote node 104. Similarly, while the host base station interfaces 103 of the host nodes 102 are described as performing the ping message receipt, ping message validation, reply ping message transmission, and alarm generation, in other embodiments, some or all of these actions are offloaded to the host node processors 106.

Figure 4:
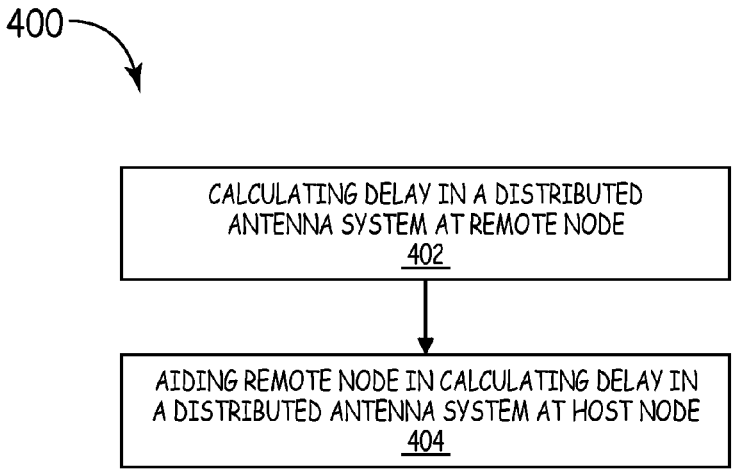
FIG. 4 is a flow diagram illustrating a method for calculating delay in a distributed antenna system.

FIG. 4 shows an exemplary embodiment of a method flow diagram for a method 400 for calculating delay in a distributed antenna system. The method 400 begins at block 402, with calculating a delay in a distributed antenna system at a remote node. In example embodiments, block 402 is implemented using any of methods 500A-B described below. The method 400 proceeds to block 404, with aiding the remote node in calculating delay in a distributed antenna system at a host node. In example embodiments, block 404 is implemented using sub-method 600 described below. It is understood that the various methods 500A-B and 600 can be combined in various ways while still being within the scope of the claims below.

Figure 5A:
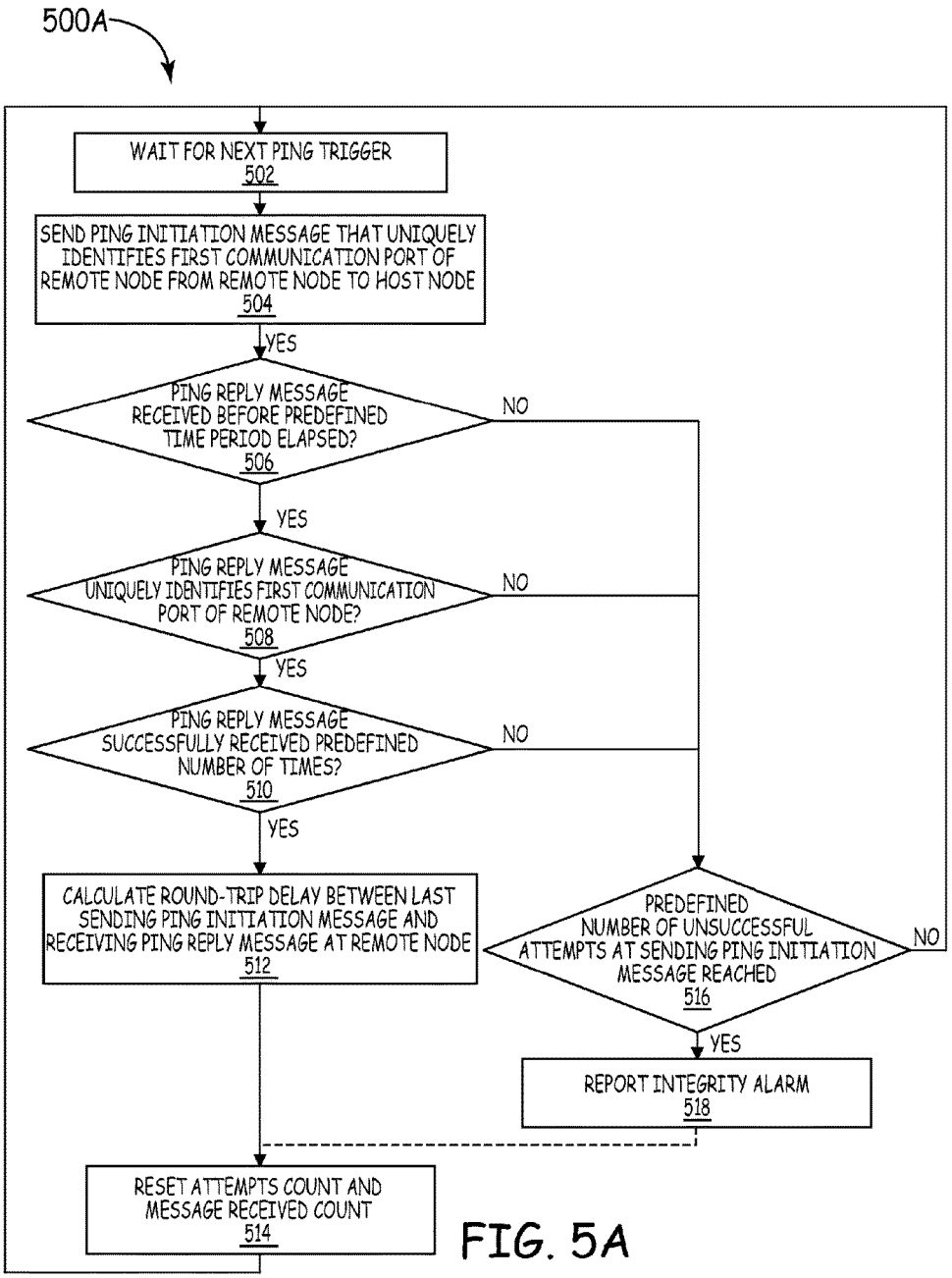
FIG. 5A is a flow diagram illustrating a sub-method for calculating delay in a distributed antenna system at a remote node.

FIG. 5A shows an exemplary embodiment of a method flow diagram for a sub-method 500A for calculating delay in a distributed antenna system at a remote node. The sub-method 500A begins at block 502, where the sub-method 500A waits for the next ping trigger to occur. Ping triggers cause the method to advance. It is desirable that the ping triggers occurring at various remote nodes in a distributed antenna system are staggered so that there is less likely a collision between the ping initiation messages and ping reply messages. Thus, in some embodiments, the ping triggers occur at pseudo-random intervals so that ping messages from each of the remote units are less likely to interfere with one another. In some embodiments, block 502 is optional and the sub-method 500A does not wait for the next ping trigger 502 and instead immediately proceeds to block 504.

Once the ping trigger occurs at block 502, the sub-method 500A proceeds to block 504, where a ping initiation message that uniquely identifies a first communication port of a remote node is sent from the remote node to a host node through a network. In some embodiments, the first communication port is part of a RF to digital interface and an antenna is coupled to the first communication port. In other embodiments, the first communication port is part of the transport interface that couples the remote node to the host node in the distributed antenna system.

The sub-method 500A proceeds to block 506, where it is determined whether a ping reply message is received before a predefined time period is elapsed since the ping initiation message was sent. Generally, this predetermined time period is selected to be long enough to allow a host node to receive and respond with a ping reply message to the remote unit. The predetermined time period is also selected to be short enough so that the ping message does not become stale. In some embodiments, block 506 is optional and the sub-method 500A does not determine whether the ping reply message is received before a predefined time period has elapsed and instead immediately proceeds to block 508.

If it is determined at block 506 that the ping reply message is received before the predefined time period is elapsed since the ping initiation message was sent, then the sub-method 500A branches to block 508, where it is determined whether the ping reply message uniquely identifies the first communication port of the remote node that was identified in the ping initiation message. In some embodiments, this determination is made by comparing a first unique identification sent from the remote node in the ping initiation message with a second unique identification received at the remote node in the ping reply message. If the first unique identification and the second unique identification match, then the ping reply message uniquely identifies the first communication port of the pinging remote node.

If it is determined at block 508 that the ping reply message uniquely identifies the first communication port of the remote node that was identified in the ping initiation message, then the sub-method 500A branches to block 510, where it is determined whether the ping reply message has been successfully received a predefined number of times. Successfully receipt occurs each time it is determined at block 508 that the ping message uniquely identifies the first communication port of the remote node. In some embodiments, a counter keeps track of how many successful receipts have occurred. In some embodiments, requiring a certain number of successful receipts before calculating the round-trip delay allows the sub-method 500A to be used to validate the integrity of the data path on which the ping messages are being sent, which increases the likelihood that the round-trip delay is accurate. In some embodiments, block 510 may be used to un-mute the transmission and reception from an antenna coupled to a corresponding port of an RF to digital interface on the remote node, once the method is confident the integrity of the path is established. Until the integrity of the path is established by receiving the ping message successfully the predefined number of times, the transmission and reception from the antenna coupled to the corresponding RF to digital interface on the remote will be muted. In addition, the data path can be muted if it is determined that there is no data path integrity, such as at block 516.

If it is determined at block 510 that the ping message has been successfully received a predefined number of times, then the sub-method 500A branches to block 512, where the round-trip delay between last sending the ping initiation message and receiving the ping reply message at the remote node is calculated at the remote node. In some embodiments, this round-trip delay is used with round-trip delays associated with other remotes in a distributed antenna system to synchronize the delays between the various remotes in the distributed antenna system.

The sub-method 500A next proceeds to block 514 where the attempt count and message received count are reset and the method returns to block 502, where the sub-method 500A waits for the next ping trigger to occur and the method repeats. The method is continually repeated to keep the round-trip delays continually updated.

If it is determined at block 506 that the ping reply message is not received before the predefined time period is elapsed since the ping initiation message was sent, then the sub-method 500A branches to block 516, where it is determined whether a predefined number of unsuccessful attempts at sending the ping initiation message has been reached. If it is determined at block 516 that the predefined number of unsuccessful attempts at sending ping invitation messages has been reached, then the sub-method 500A branches to block 518, where an integrity alarm is reported. The integrity alarm indicates that there is something wrong with the integrity of the path between the pinging remote node and the host node. In some embodiments, the integrity alarm indicates which of test was failed, such as any of the tests in decision blocks 506, 508, and 510. In some embodiments, the sub-method 500A continues onto block 514 and repeats according to the description above to see if a round-trip delay can still be determined. In other embodiments, once an integrity alarm is reported, the method will stop until the distributed antenna system is serviced to correct the integrity issue in the path.

If it is determined at block 508 that the ping reply message does not uniquely identify the first communication port of the remote node that was identified in the ping initiation message, then the sub-method 500A braches to block 516, where it is determined whether a predefined number of unsuccessful attempts at sending the ping initiation message has been reached and continues as described above.

If it is determined at block 510 that the ping reply message has not been successfully received a predefined number of times, then the sub-method 500A branches to block 516, where it is determined whether a predefined number of unsuccessful attempts at sending the ping initiation message has been reached and continues as described above. In other embodiments, if it is determined at block 510 that the ping reply message has not been successfully received a predefined number of times, then the sub-method 500A branches directly back to block 502 without going first to block 516.

In addition, it is understood that some of the blocks of sub-method 500A can be rearranged without departing from the scope of the claims below. Specifically, in some embodiments, blocks 506, 508, and 510 are in different orders, such that the various tests are performed in a different order. In some embodiments, after the round trip-delay is calculated, a signal path delay (as described above) is calculated at the remote node based on the round-trip delay.

Figure 5B:
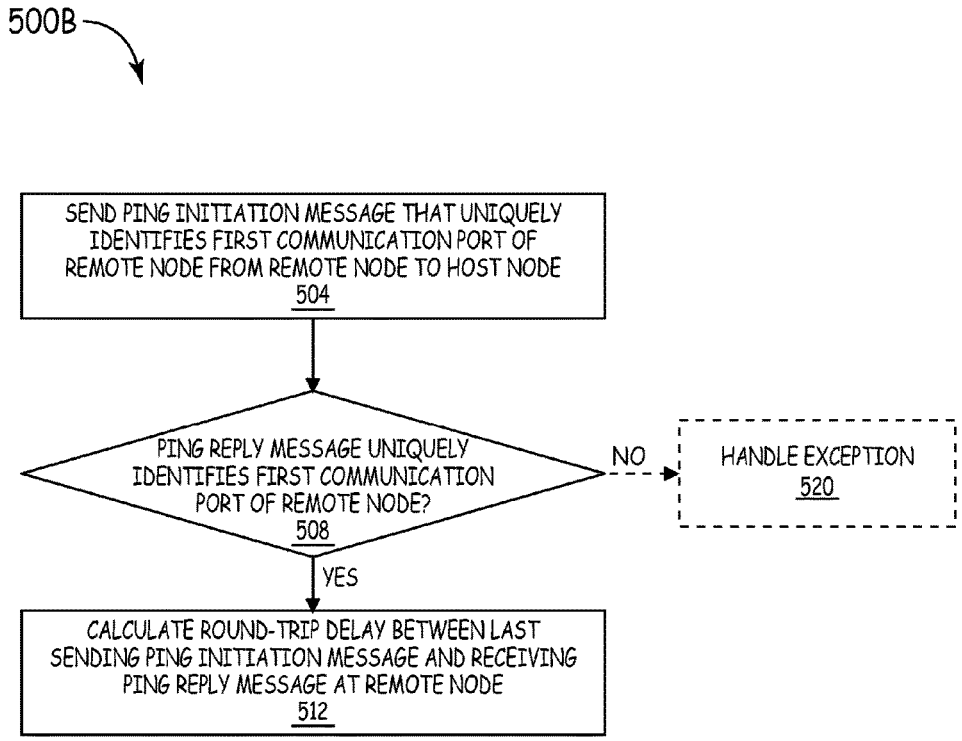
FIG. 5B is a flow diagram illustrating another sub-method for calculating delay in a distributed antenna system at a remote node.

FIG. 5B shows an exemplary embodiment of a method flow diagram for a sub-method 500B for calculating delay in a distributed antenna system at a remote node. The sub-method 500B shares blocks 504, 508, and 512 with sub-method 500A, but omits the other steps found in sub-method 500A.

Specifically, the sub-method 500B begins at block 504, where a ping initiation message that uniquely identifies a first communication port of a remote node is sent from the remote node to a host node through a network. In some embodiments, the first communication port is part of a RF to digital interface and an antenna is coupled to the first communication port. The sub-method 500B proceeds to block 508, where it is determined whether the ping reply message uniquely identifies the first communication port of the remote node that was identified in the ping initiation message.

If it is determined at block 508 that the ping reply message uniquely identifies the first communication port of the remote node that was identified in the ping initiation message, then the sub-method 500B continues to block 510, where it is determined whether the ping reply message has been successfully received a predefined number of times. Successfully receipt occurs each time it is determined at block 508 that the ping message uniquely identifies the first communication port of the remote node. In some embodiments, a counter keeps track of how many successful receipts have occurred.

In some embodiments, if it is determined at block 508 that the ping reply message does not uniquely identify the first communication port of the remote node, then the sub-method 500B branches to optional block 520, where the exception is handled. In some embodiments, the optional block 520 triggers errors or simply ignores the reply message that does not uniquely identify the first communication port of the remote node.

It is understood that any combination of the steps of sub-method 500A that are omitted from sub-method 500B could be used as optional steps in sub-method 500B. In addition, the sub-method 500B could be repeated to send more ping initiation messages and receive more ping reply messages.

Figure 6:
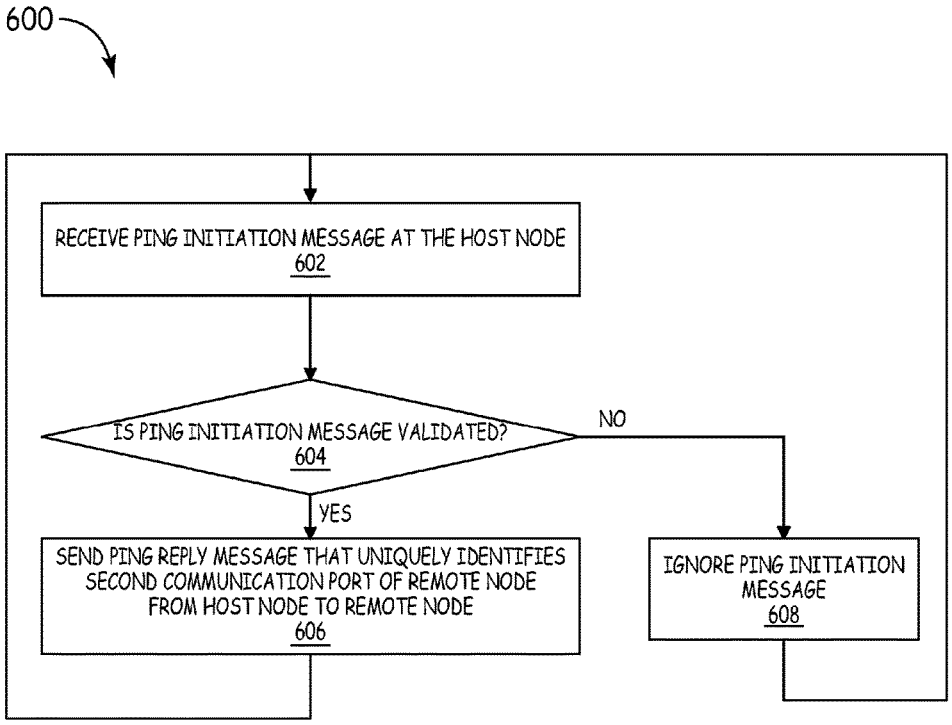
FIG. 6 is a flow diagram illustrating a sub-method for aiding a remote node in calculating delay in a distributed antenna system at a host node.

FIG. 6 shows an exemplary embodiment of a method flow diagram for a sub-method 600 for aiding a remote node in calculating delay in a distributed antenna system at a host node. The sub-method 600 can be implemented in concert with sub-method 500A described above to implement a method of performing a complete end-to-end ping. The sub-method 600 begins at block 501 and proceeds to block 602, where a ping initiation message is received at a host node. In some embodiments, the remote node includes a host base station interface and the host base station interface receives the ping initiation message. In some embodiments, the ping initiation message is a ping message sent from a remote unit in a network.

The method proceeds to block 604, where the ping initiation message is validated. The ping initiation message can be validated in a number of ways, including but not limited to, validation of a CRC code, a message type, a host base station interface type, a host node ID number, and/or a host base station ID number. The validation of some of these values can occur by simply comparing the value received in the ping initiation message with an expected value stored in the host node 102.

If the ping initiation message is validated at block 604, then the sub-method 600 branches to block 606, where the ping reply message that uniquely identifies a second communication port of the remote node is sent from the host node to the remote node. The sub-method 600 next continues back to block 602, where another ping initiation message is received and the sub-method 600 is repeated. In some embodiments, this second ping initiation message is from the same remote unit as the first ping initiation message. In other embodiments, this second ping initiation message is from a different remote unit as the second ping initiation message.

If the ping initiation message is not validated at block 604, then the sub-method 600 branches to block 608, where the ping initiation message is ignored. In other embodiments, an alarm can be triggered by the lack of validation of the message. The triggered alarm may include an indication of how the ping initiation message failed validation. In other embodiments, there is no block 608. The sub-method 600 next continues back to block 602, where another ping initiation message is received and the sub-method 600 is repeated. In some embodiments, this second ping initiation message is from the same remote unit as the first ping initiation message. In other embodiments, this second ping initiation message is from a different remote unit as the second ping initiation message.

In some embodiments, each of the sub-methods described above, such as sub-method 500A, sub-method 500B, and sub-method 600, are implemented as individual methods.

The invention claimed is:

1. A distributed antenna system comprising:

a host node including a host node processor, the host node having a first communication port communicatively coupled to a base station of a mobile telephone network, the host node also having a second communication port;

a first remote node in communication with the host node, the first remote node including a first remote node processor, a third communication port communicatively coupled to the second communication port of the host node across a first distinct signal path, and a fourth communication port communicatively coupled to a first antenna;

a second remote node in communication with the host node, the second remote node including a second remote node processor, a fifth communication port communicatively coupled to at least one of [a third communication port of the host node and] a sixth communication port of the *host node and a seventh communication port of the* first remote node across a second distinct signal path, and [a seventh] *an eighth* communication port communicatively coupled to a second antenna;

wherein the first remote node processor comprises program instructions that:

cause the first remote node to send a first [ping] initiation message to the host node across the first distinct signal path *as a part of a process to determine signal delay*, wherein the first [ping] initiation message includes a first unique identification that uniquely identifies at least one of the third communication port and the fourth communication port of the first remote node to the host node;

cause the first remote node to determine whether a first [ping] reply message [received] *sent as a part of the process to determine signal delay* from the host node *that is received from the first remote node* corresponds to the at least one of the third communication port and the fourth communication port of the first remote node based on the first unique identification; and when the first [ping] reply message received from the host node corresponds to the at least one of the third communication port and the fourth communication port of the first remote node, cause the first remote node to calculate a first elapsed time between sending the first [ping] initiation message and receiving the first [ping] reply message;

wherein the second remote node processor comprises program instructions that:

cause the second remote node to send a second [ping] initiation message to the host node across the second distinct signal path *as a part of the process to determine signal delay*, wherein the second [ping] initiation message includes a second unique identification that uniquely identifies at least one of the fifth communication port[, the sixth communication port,] and the [seventh] *eighth* communication port of the second remote node to the host node;

cause the second remote node to determine whether a second [ping] reply message [received] *sent as a part of the process to determine signal delay* from the host node *that is received from the second remote node* corresponds to the at least one of the fifth communication port[, the sixth communication port,] and the [seventh] *eighth* communication port of the second remote node based on the second unique identification; and

[wherein] *when* the second [ping] reply message received from the host node corresponds to the at least one of the fifth communication port[, the sixth communication port,] and the [seventh] *eighth* communication port of the second remote node, cause the second remote node to [calculated] *calculate* a second elapsed time between sending the second [ping] initiation message and receiving the second [ping] reply message; and wherein the host node processor comprises program instructions that:

cause the host node to validate the first [ping] initiation message received from the first remote node;

when the first [ping] initiation message is validated, cause the host node to send the first [ping] reply message to the first remote node, wherein the first [ping] reply message corresponds to the first [ping] initiation message and also uniquely identifies the at least one of the third communication port and the fourth communication port of the first remote node;

cause the host node to validate the second [ping] initiation message received from the second remote node; and

[wherein] *when* the second [ping] initiation message is validated, cause the host node to send the second [ping] reply message to the second remote node, wherein the second [ping] reply message corresponds to the second [ping] initiation message and also uniquely identifies the at least one of the fifth communication port[, the sixth communication port,] and the [seventh] *eighth* communication port.

2. The distributed antenna system of claim 1, wherein the first unique identification is a path code that identifies a first path between the at least one of the third communication port and the fourth communication port of the first remote node and at least one of the first communication port and the second communication port of the host node.

3. The distributed antenna system of claim 2, wherein the path code uniquely identifies the host node, the at least one of the first communication port and the second communication port, the at least one of the third communication port and the fourth communication port, and the first distinct signal path between the host node and the first remote node.

4. The distributed antenna system of claim 1, wherein the first remote node is separated from the host node by at least one additional remote node.

5. The distributed antenna system of claim 1, wherein at least one of the first communication port and the fourth communication port is part of a radio frequency to digital interface that converts between radio frequency signals and digital signals.

6. The distributed antenna system of claim 1, wherein a single bit in each timeslot of a data frame is used to transmit the first [ping] initiation message and the first [ping] reply message.

7. The distributed antenna system of claim 1, wherein the first remote node processor program instructions further cause the first remote node to:

verify whether the fourth communication port of the first remote node is compatible with a first type of the first communication port of the host node based on the first [ping] reply message received from the host node.

8. The distributed antenna system of claim 7, wherein the first remote node processor program instructions further cause the first remote node to at least one of:

mute the fourth communication port of the first remote node when it is determined that the fourth communication port of the first remote node is not compatible with the first type of the first communication port of the host node; and trigger an alarm to indicate a mismatch between the first type of the first communication port of the host node and the fourth communication port of the first remote node.

9. The distributed antenna system of claim 1, wherein the host node processor program instructions cause the host to validate the first [ping] initiation message received from the first remote node by validating at least one of a message type, a host base station interface type, a host node ID number, a host base station ID number, and a cyclic redundancy check code.

10. The distributed antenna system of claim 1, wherein the host node processor program instructions further cause the host node to:

trigger an alarm if certain items in the first [ping] initiation message received from the first remote node are not validated by the host node.

11. The distributed antenna system of claim 1, wherein at least one of the host node processor and the first remote node processor is at least one of a programmable processor, a microcontroller, an application-specific integrated circuit (ASIC), a field-programmable gate array (FPGA), a field-programmable object array (FPOA), and a programmable logic device (PLD).

12. A method for calculating delay in a distributed antenna system comprising:

sending a first [ping] initiation message from a first remote node in the distributed antenna system to a host node in the distributed antenna system across a first distinct signal path coupling the first remote node to the host node *as a part of a process to determine signal delay*, wherein the first [ping] initiation message uniquely identifies a first communication port of the first remote node to the host node with a first unique identification;

receiving a first [ping] reply message at the *first* remote node from the host node, the first [ping] reply message transmitted from the host node to the first remote node across the first distinct signal path coupling the first remote node to the host node;

determining, at the first remote node, whether the first [ping] reply message *sent as a part of the process to determine signal delay* uniquely identifies the first communication port of the first remote node with the first unique identification;

when the first [ping] reply message uniquely identifies the first communication port of the first remote node, calculating a first round-trip time delay between sending the first [ping] initiation message and receiving the first [ping] reply message at the first remote node;

sending a second [ping] initiation message from a second remote node in the distributed antenna system to the host node in the distributed antenna system across a second distinct signal path coupling the second remote node to the host node *as a part of the process to determine signal delay*, wherein the second [ping] initiation message uniquely identifies a second communication port of the second remote node to the host node with a second unique identification;

receiving a second [ping] reply message at the *second* remote node from the host node, the second [ping] reply message transmitted from the host node to the second remote node across the second distinct signal path coupling the second remote node to the host node;

determining, at the second remote node, whether the second [ping] reply message *sent as a part of the process to determine signal delay* uniquely identifies the second communication port of the second remote node with the second unique identification; and when the second [ping] reply message uniquely identifies the second communication port of the second remote node, calculating a second round-trip *time* delay between sending the second [ping] initiation message and receiving the second [ping] reply message at the second *remote* node.

13. The method of claim 12, wherein the first unique identification is a path code that identifies a first path between the first communication port of the remote node and a third communication port of the host node.

14. The method of claim 13, wherein the path code uniquely identifies the host node, the first communication port, the third communication port, and the first distinct signal path between the host node and the first remote node.

15. The method of claim 12, further comprising:

calculating a first signal path delay at the first remote node based on the first round-trip *time* delay.

16. The method of claim 15, wherein calculating the first signal path delay includes:

dividing the first round-trip *time* delay by a number to determine a one-way delay between at least one of sending and receiving the first [ping] initiation message and sending and receiving the first [ping] reply message.

17. The method of claim 15, wherein calculating the first signal path delay includes:

factoring intrinsic processing delays into the calculation of the first signal path delay.

18. The method of claim 17, wherein the intrinsic processing delays are pre-determined processing delays associated with internal processing occurring at least one of the host node and the first remote node.

19. The method of claim 15, wherein the first signal path delay approximates at least one of:

a forward path time delay between radio frequency spectrum being received at a radio frequency port of the host node and being output at a radio frequency port of the first remote node; and a reverse path time delay between radio frequency spectrum being received at the radio frequency port of the first remote node and being output at the radio frequency port of the host node.

20. The method of claim 12, further comprising forwarding the first [ping] initiation message received from the first remote node toward the host node at a third remote node positioned between the first remote node and the host node; and forwarding the first [ping] reply message received from the host node toward the first remote node at the third remote node positioned between the first remote node and the host node.

21. The method of claim 12, wherein validating the first [ping] initiation message includes at least one of performing a cyclic redundancy check on the first [ping] initiation message, validating a message type, validating a host base station interface type, validating a host node ID number, and validating a host base station ID number.

22. The method of claim 12, further comprising:

determining, at the first remote node, whether the first [ping] reply message is received before a predefined timeout period elapses since the first [ping] initiation message was sent before determining whether the first [ping] reply message uniquely identifies the first communication port of the first remote node with the first unique identification; and wherein determining whether the first [ping] reply message uniquely identifies the first communication port of the first remote node with the first unique identification only occurs when the first [ping] reply message is received before the predefined timeout period elapses since the first [ping] initiation message was sent;

when the first [ping] reply message is not received before the predefined timeout period elapses, determining whether a predefined number of unsuccessful attempts at sending the first [ping] initiation message has been reached;

when the predefined number of unsuccessful attempts at sending the first [ping] initiation message has been reached, resending the first [ping] initiation message when a next [ping] trigger occurs.

23. The method of claim 22, wherein the next [ping] trigger occurs at a pseudo-random time determined using a pseudo-random back-off algorithm to minimize the chance of a collision between other upstream messages.

24. The method of claim 12, further comprising:

determining, at the first remote node, whether the first [ping] reply message has been successfully received a predefined number of times; and wherein calculating the first round-trip time delay between sending the first [ping] initiation message and receiving the first [ping] reply message at the first remote unit only occurs when the first [ping] reply message has been successfully received a predefined number of times; and when the first [ping] reply message has not been successfully received a predefined number of times, resending the first [ping] initiation message when a next [ping] trigger occurs.

25. The method of claim 24, wherein the next [ping] trigger occurs at a pseudo-random time determined using a pseudo-random back-off algorithm to minimize the chance of a collision between other upstream messages.

26. The method of claim 12, further comprising:

when the first [ping] reply message received at the first remote node does not correspond to at least one communication port of the first remote node, ignoring the first [ping] reply message at the first remote node.

27. The method of claim 12, further comprising:

determining, at the first remote node, whether a predefined number of unsuccessful attempts at sending the first [ping] initiation message has been reached; and when the predefined number of unsuccessful attempts at sending the first [ping] initiation message has been reached, reporting a path integrity alarm.

28. The method of claim 12, further comprising:

converting messages received from an antenna connected to the first remote node from first radio frequency signals to first digital signal; and converting messages to be transmitted via the antenna from second digital signals to second radio frequency signals.

29. The method of claim 12, further comprising:

receiving the first [ping] initiation message at the host node;

validating the first [ping] initiation message at the host node; and when the first [ping] initiation message is validated, sending the first [ping] reply message to the first remote node.

30. The method of claim 29, further comprising:

when a third *initiation* message received at the host node is not validated at the host node, ignoring the third *initiation* message.

31. The method of claim 29, further comprising:

converting messages received from an antenna connected to the host node from first radio frequency signals to first digital signals; and converting messages to be transmitted via the antenna from second digital signals to second radio frequency signals.

32. The method of claim 12, wherein a single bit in each timeslot of a data frame is used to transmit the first [ping] initiation message and the first [ping] reply message.

33. The method of claim 12, further comprising:

after calculating the first round-trip time delay between sending the first [ping] initiation message and receiving the first [ping] reply message at the first remote node, resetting an attempts count and a message received count, wherein the attempts count tracks how many unsuccessful attempts have been made at [pinging] *sending an initiation message to the host node and receiving a reply message from* the host node, wherein the message received count tracks how many times the message has been successfully received.

34. The method of claim 12, further comprising:

waiting for a next [ping] trigger;

once the next [ping] trigger has occurred, sending a third [ping] initiation message from the first remote node to the host node, wherein the third [ping] initiation message uniquely identifies a third communication port of the first remote node to the host node with a third unique identification;

receiving a third [ping] reply message at the first remote node;

determining, at the first remote node, whether the third [ping] reply message uniquely identifies the third communication port of the first remote node with the third unique identification; and when the third [ping] reply message uniquely identifies the third communication port of the first remote node, calculating a third round-trip time delay between sending the third [ping] initiation message and receiving the third [ping] reply message at the first remote node.

35. A plurality of remote nodes in a distributed antenna system comprising:

a first remote node having:

a first communication port communicatively coupled to a first antenna;

a second communication port communicatively coupled to a host node; and a first remote node processor, wherein the first remote node processor comprises program instructions that:

cause the first remote node to send a first [ping] initiation message to the host node across a first communication link established across a first distinct signal path between the second communication port and the host node *as part of a process to determine signal delay*, wherein the first [ping] initiation message includes a first unique identification that uniquely identifies at least one of the first communication port and the second communication port of the first remote node to the host node;

cause the first remote node to determine whether a first [ping] reply message [received] *sent as a part of the process to determine signal delay* from the host node *that is received from the first remote node* corresponds to the at least one of the first communication port and the second communication port of the first remote node based on the first unique identification; and when the first [ping] reply message received from the host node corresponds to the at least one of the first communication port and the second communication port, cause the first remote node to calculate the elapsed time between sending the first [ping] initiation message and receiving the first [ping] reply message;

a second remote node having:

a third communication port communicatively coupled to a second antenna;

a fourth communication port communicatively coupled to the host node; and a second remote node processor, wherein the second remote node processor comprises program instructions that:

cause the second remote node to send a second [ping] initiation message to the host node across a second communication link established across a second distinct signal path between the fourth communication port and the host node *as part of the process to determine signal delay*, wherein the second [ping] initiation message includes a second unique identification that uniquely identifies at least one of the third communication port and the fourth communication port of the second remote node to the host node;

cause the second remote node to determine whether a second [ping] reply message [received] *sent as a part of the process to determine signal delay* from the host node *that is received from the second remote node* corresponds to the at least one of the third communication port and the fourth communication port of the second remote node based on the second unique identification; and when the second [ping] reply message received from the host node corresponds to the at least one of the third communication port and the fourth communication port, cause the second remote node to calculate the elapsed time between sending the second [ping] initiation message and receiving the second [ping] reply message.

36. The plurality of remote nodes of claim 35, wherein the first unique identification is a path code that identifies a path between the at least one of the first communication port and the second communication port of the first remote node and at least one communication port of the host node.

37. The plurality of remote nodes of claim 36, wherein the path code uniquely identifies the host node, the at least one communication port of the host node, the at least one of the first communication port and the second communication port of the remote node, and the first distinct signal path between the host node and the first remote node.

38. The plurality of remote nodes of claim 35, wherein the first remote node is separated from the host node by at least one additional remote node in the distributed antenna system.

39. The plurality of remote nodes of claim 35, wherein the first communication port is part of a radio frequency to digital interface that converts between radio frequency signals and digital signals.

40. The plurality of remote nodes of claim 35, wherein a single bit in each timeslot of a data frame is used to transmit the first [ping] initiation message and the first [ping] reply message.

41. The plurality of remote nodes of claim 35, wherein the first remote node processor program instructions further cause the first remote node to:

verify whether the first communication port of the first remote node is compatible with a first type of at least one communication port of the host node based on the first [ping] reply message received from the host node.

42. The plurality of remote nodes of claim 41, wherein the first remote node processor program instructions further cause the first remote node to at least one of:

mute the first communication port of the first remote node when it is determined that the first communication port of the first remote node is not compatible with the first type of the at least one communication port of the host node; and trigger an alarm to indicate a mismatch between the first type of the at least one communication port of the host node and the first communication port of the first remote node.

43. The plurality of remote nodes of claim 35, wherein at least one of the first remote node processor and the second remote node processor is at least one of a programmable processor, a microcontroller, an application-specific integrated circuit (ASIC), a field-programmable gate array (FPGA), a field-programmable object array (FPOA), and a programmable logic device (PLD).

44. A program product comprising program instructions, embodied on a non-transitory storage medium, the program instructions cause at least one programmable processor in each of a plurality of remote nodes within a distributed antenna system to:

cause a particular remote node to send a [ping] initiation message to a host node across a communication link established across a distinct signal path between the remote node and the host node *as part of a process to determine signal delay*, wherein the [ping] initiation message includes a unique identification that uniquely identifies at least one communication port of the remote node to the host node, *wherein the distinct signal path between the remote node and the host node is used for data communication*;

cause the particular remote node to determine whether a [ping] reply message [received] *as a part of the process to determine signal delay* from the host node *that is received from the particular remote node across the distinct signal path* corresponds to the at least one communication port of the remote node based on the unique identification; and when the [ping] reply message received from the host node corresponds to the at least one communication port of the remote node based on the unique identification, calculate the elapsed time between sending the [ping] initiation message and receiving the [ping] reply message.

* * * * *